(12) United States Patent
Kakutani et al.

(10) Patent No.: US 12,732,053 B2
(45) Date of Patent: Sep. 8, 2026

(54) THREE-PHASE COIL STRUCTURE AND LINEAR MOTOR

(71) Applicants: Proterial, Ltd., Tokyo (JP); Yamaha Robotics Co., Ltd., Musashimurayama (JP)

(72) Inventors: Osamu Kakutani, Musashimurayama (JP); Seiki Takedomi, Takasaki (JP); Tatsuya Nakano, Takasaki (JP); Minoru Yoshida, Takasaki (JP)

(73) Assignees: Proterial, Ltd., Tokyo (JP); Yamaha Robotics Co., Ltd., Tokyo (JP)

( * ) Notice: Subject to any disclaimer, the term of this patent is extended or adjusted under 35 U.S.C. 154(b) by 160 days.

(21) Appl. No.: 18/729,728

(22) PCT Filed: Jan. 13, 2023

(86) PCT No.: PCT/JP2023/000710
§ 371 (c)(1),
(2) Date: Jul. 17, 2024

(87) PCT Pub. No.: WO2023/140179
PCT Pub. Date: Jul. 27, 2023

(65) Prior Publication Data

US 2025/0088058 A1 Mar. 13, 2025

(30) Foreign Application Priority Data

Jan. 21, 2022 (JP) ................................ 2022-008031

(51) Int. Cl.
*H02K 3/47* (2006.01)
*H02K 33/18* (2006.01)

(52) U.S. Cl.
CPC .............. *H02K 3/47* (2013.01); *H02K 33/18* (2013.01)

(58) Field of Classification Search
CPC ................................ H02K 3/47; H02K 33/18
(Continued)

(56) References Cited

U.S. PATENT DOCUMENTS

2003/0151314 A1* 8/2003 Mori ..................... H02K 41/03 310/12.22
2011/0273052 A1* 11/2011 Long ......................... B62J 6/06 310/208
(Continued)

FOREIGN PATENT DOCUMENTS

JP 2005-39961 A 2/2005
JP 2012-157183 A 8/2012
(Continued)

OTHER PUBLICATIONS

Akama et al., English Machine Translation of JP2013046500 (Year: 2013).*
(Continued)

*Primary Examiner* — Rashad H Johnson
(74) *Attorney, Agent, or Firm* — Bret E. Field; Bozicevic, Field & Francis LLP

(57) ABSTRACT

A three-phase coil structure (30) having a two-phase coil set (32) including a plurality of rectangular air-core coils arranged side by side so as to be adjacent to each other in the same plane includes a one-phase coil set (31) including two air-core coils having different sizes and bending angles bent at both ends and disposed to straddle adjacent long sides of the two-phase coil set (32), wherein a number of turns of each of the air-core coils of the one-phase coil set (31) is larger than a number of turns of each of the air-core coils of the two-phase coil set (32).

7 Claims, 13 Drawing Sheets

(58) Field of Classification Search
USPC .............................................. 310/28, 29, 33
See application file for complete search history.

(56) References Cited

U.S. PATENT DOCUMENTS

2012/0175973 A1 7/2012 Moriyama et al.
2012/0293035 A1* 11/2012 Nakamura ............ H02K 21/14 310/208
2012/0306310 A1* 12/2012 Takeuchi ............ H02K 15/066 29/596
2013/0082560 A1* 4/2013 Takeuchi ............... B60L 50/20 310/156.01
2014/0285055 A1* 9/2014 Tomohara ............... H02K 3/12 428/377
2014/0285056 A1* 9/2014 Tomohara ............... H02K 3/28 29/596
2015/0222167 A1 8/2015 Aoyama et al.
2016/0105087 A1 4/2016 Ikeda et al.
2019/0363596 A1* 11/2019 Takeuchi ............ H02K 15/066
2021/0384786 A1* 12/2021 Tamura ................. H02K 1/278
2021/0384794 A1* 12/2021 Tamura ................. H02K 3/522
2021/0384808 A1* 12/2021 Tamura ................. H02K 1/278
2022/0263356 A1* 8/2022 Hijikata .................. H02K 1/16
2023/0216365 A1* 7/2023 Takeuchi ................. H01F 5/00 310/266
2023/0412028 A1* 12/2023 Kiba ....................... H02K 3/28

FOREIGN PATENT DOCUMENTS

| | | | |
|---|---|---|---|
| JP | 5508362 | B2 | 5/2014 |
| JP | 2018-139496 | A | 9/2018 |
| TW | 200511689 | A | 3/2005 |
| TW | 200941900 | A | 10/2009 |
| TW | 201440392 | A | 10/2014 |

OTHER PUBLICATIONS

English translation of International Search Report for PCT Application No. PCT/JP2023/000710 mailed Mar. 7, 2023.
Written Decision on Registration for Korean Application No. 10-2024-7025523 mailed Jul. 2, 2025, with its English translation, 8 pages.

* cited by examiner 100
10
11
12
11
13
II
II
12
20

20
42
32
32
30
43
40
41
31
31B
31A 30
32
322
321
311A
311B
324
31A
31B
31
314B
314A
314
324
V
312B
312A
321
322
32
V
323
313
313A
313B
323
VI
VI 30
323
313B
313B
31B
31B
313A
313A
31A
31A
322
32
31A
31A
314A
314A
31B
31B
314B
314B
324

31A
311A
312A
313A
314A
315A
316A
318A
31B
311B
312B
313B
314B
315B
316B
318B
IX

A
B
313A
318A
310A
312A
31A
314A
319A
317A
10°~31°
t
313B
318B
310B
312B
31B
314B
319B
317B
30°~44.5°
2t

THREE-PHASE COIL STRUCTURE AND LINEAR MOTOR

CROSS-REFERENCE TO RELATED APPLICATIONS

This application is the national phase under 35 U. S. C. § 371 of PCT International Application No. PCT/JP2023/000710 which has an international filing date of Jan. 13, 2023 and designated the United States of America.

FIELD

The present invention relates to a three-phase coil structure and a linear motor.

BACKGROUND

In recent years, linear motors using flat air-core coils have been widely spread. For example, Patent Literature 1 discloses a linear motor that has two types of large and small air-core coils related to each phase and suppresses a thickness of a three-phase coil structure by bending an end of an air-core coil related to one phase and overlapping the end of the air-core coil with an air-core coil related to another phase.

SUMMARY

In Japanese Patent No. 5508362, to prevent differences in impedance and thrust from occurring between an air-core coil related to one phase and an air-core coil related to another phase, two types of large and small air-core coils are provided to have the same number of turns for all phases.

In this way, the linear motor of Japanese Patent No. 5508362 fails to obtain favorable efficiency performance for a configuration area of an air-core coil due to a decrease in thrust resulting from a decrease in linkage length (mutual inductance), etc.

The invention has been made in view of such circumstances, and an object of the invention is to provide a three-phase coil structure and a linear motor capable of obtaining favorable performance while being made compact.

A three-phase coil structure according to the invention is a three-phase coil structure having a two-phase coil set including a plurality of rectangular air-core coils arranged side by side to be adjacent to each other in the same plane, the three-phase coil structure including a one-phase coil set including two air-core coils having different sizes and bending angles bent to both ends and disposed to straddle adjacent long sides of the two-phase coil set, in which a number of turns of each of the air-core coils of the one-phase coil set is larger than a number of turns of each of the air-core coils of the two-phase coil set.

In the invention, while making the three-phase coil structure compact by appropriately combining and disposing the two air-core coils of the one-phase coil set having different sizes and bending angles at both ends, it is possible to prevent reduction of performance such as a decrease in thrust due to a decrease in linkage length (mutual inductance) by increasing the number of turns of the air-core coil of the one-phase coil set than the number of turns of the air-core coil of the two-phase coil set.

In the three-phase coil structure according to the invention, the one-phase coil set includes a large air-core coil having a length dimension equivalent to a length dimension of the air-core coils of the two-phase coil set, and a small air-core coil having a length dimension smaller than a length dimension of the large air-core coil, and the number of turns of at least one of the large air-core coil and the small air-core coil is larger than the number of turns of each of the air-core coils of the two-phase coil set.

In the invention, since the length dimension of the small air-core coil is smaller than that of the air-core coil of the two-phase coil set, it is possible to prevent reduction of performance such as a decrease in thrust due to a decrease in linkage length by increasing the number of turns of at least one of the large air-core coil and the small air-core coil than the number of turns of the air-core coil of the two-phase coil set while making the three-phase coil structure compact.

In the three-phase coil structure according to the invention, the large air-core coil and the small air-core coil are disposed on the same axis, and both ends of each of the large air-core coil and the small air-core coil are bent in crank shapes to one side in an axial direction, and both ends of the large air-core coil overlap with ends of the air-core coil of the two-phase coil set, respectively.

In the invention, since the both ends of the large air-core coil are bent in the crank shapes and overlap with the ends of the air-core coil of the two-phase coil set, respectively, the three-phase coil structure may be made compact.

In the three-phase coil structure according to the invention, the both ends of the large air-core coil are bent at 30° to 44.5°, and the both ends of the small air-core coil are bent at 10° to 31°.

In the invention, by setting the bending angle of the both ends of the large air-core coil at 30° to 44.5° and setting the bending angle of the both ends of the small air-core coil at 10° to 31°, it is possible to prevent a defect such as a crack from occurring in the air-core coil during bending processing when the bending angle is excessively large, and to prevent a decrease in thrust in advance due to a decrease in linkage length of the small air-core coil when the bending angle is excessively small.

In the three-phase coil structure according to the invention, the small air-core coil is disposed on the one side in the axial direction with respect to the large air-core coil, and one surface of the small air-core coil is in contact with one surface of the large air-core coil, and an interval between the one surface of the large air-core coil and a reverse surface of an opposing-surface facing the two-phase coil set of the ends of the large air-core coil is greater than or equal to an interval between the one surface of the small air-core coil and a reverse surface of an opposing-surface facing the large air-core coil of the ends of the small air-core coil.

In the invention, one surface of the small air-core coil comes into contract with one surface of the large air-core coil, and an interval between the one surface of the large air-core coil and a reverse surface of an opposing-surface facing the two-phase coil set of the ends of the large air-core coil is greater than or equal to an interval between the one surface of the small air-core coil and a reverse surface of an opposing-surface facing the large air-core coil of the ends of the small air-core coil. Therefore, the three-phase coil structure can be made compact without the small air-core coil protruding more than the large air-core coil to the one side in the axial direction.

In the three-phase coil structure according to the invention, two two-phase coil sets are stacked in one direction, the one-phase coil set is provided on each of both sides of the two stacked two-phase coil sets in the one direction, and the two one-phase coil sets are disposed on the same axis and both ends of each of the two one-phase coil sets are bent in mutually opposite directions.

In the invention, the one-phase coil set is provided on each of both sides of the two two-phase coil sets stacked in the one direction, and bending direction of both ends of the two one-phase coil sets is mutually opposite direction. The three-phase coil structure can be made compact without the small air-core coil protruding more than the large air-core coil in the one direction in each one-phase coil set.

A linear motor according to the invention includes any one of the three-phase coil structures described above, and magnets disposed on both sides of the three-phase coil structure to face each other in the axial direction of the one-phase coil set.

In the invention, as described above, since the three-phase coil structure which is compact and can prevent reduction of performance such as a decrease in thrust due to a decrease in linkage length is used, the linear motor can be made compact, and excellent performance can be obtained.

According to the invention, it is possible to provide a three-phase coil structure and a linear motor capable of obtaining favorable performance while being made compact.

The above and further objects and features will more fully be apparent from the following detailed description with accompanying drawings.

DETAILED DESCRIPTION

Hereinafter, a three-phase coil structure and a linear motor according to embodiments of the invention will be described in detail based on the drawings.

Figure 1:
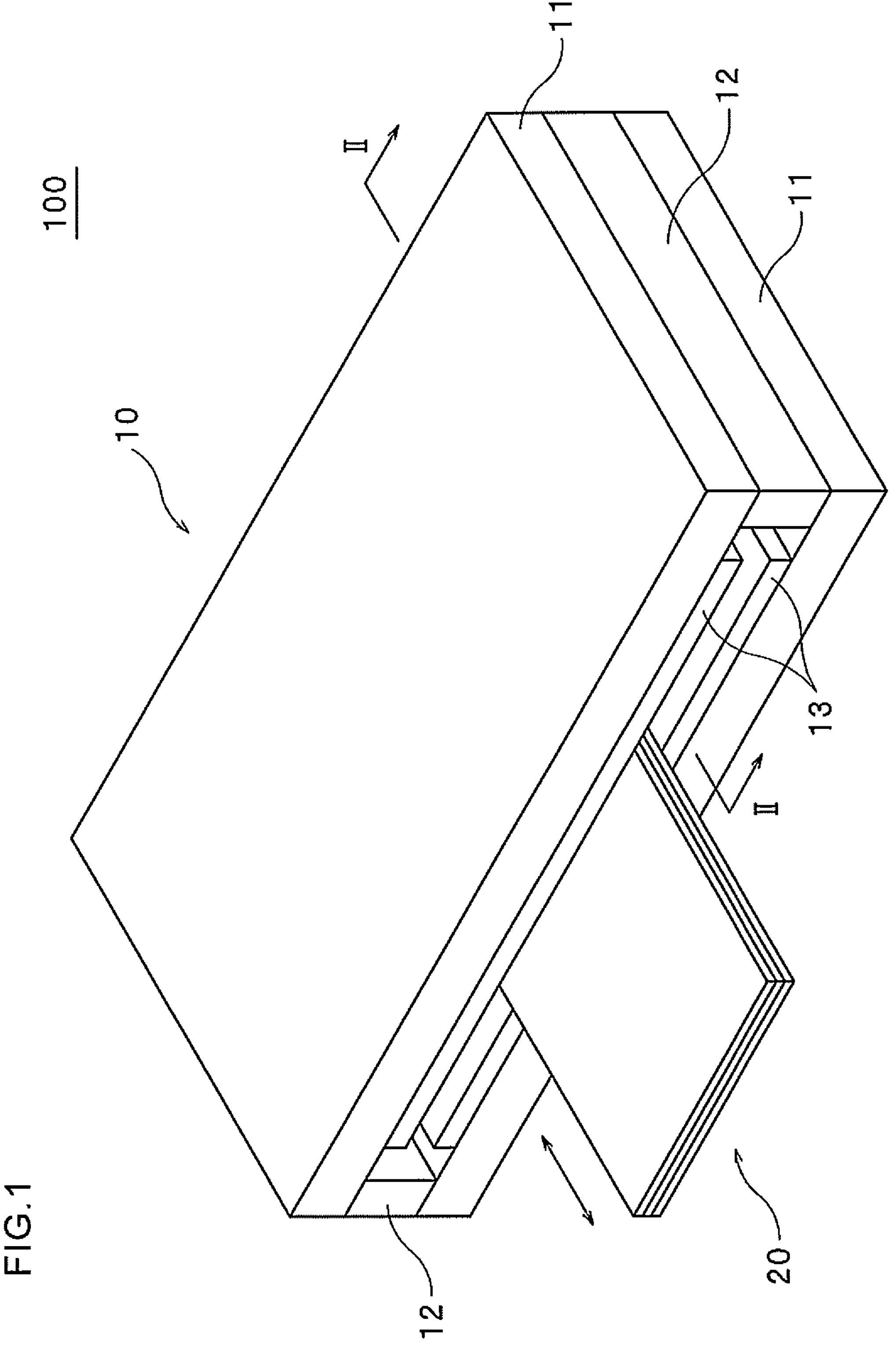
FIG. 1 is a perspective view illustrating an appearance of a linear motor according to an embodiment of the invention.

FIG. 1 is a perspective view illustrating an appearance of a linear motor 100 according to an embodiment of the invention. The linear motor 100 is, for example, a movable coil type linear motor, and includes a stator 10 and a movable element 20. The movable element 20 is connected to a power supply (not illustrated).

The stator 10 includes a pair of yokes 11 each having a rectangular flat plate shape, and an intervening portion 12 interposed between the pair of yokes 11 to connect both ends of the yokes 11. The intervening portion 12 is disposed on short sides of the yokes 11. The yokes 11 are disposed to face each other at a predetermined distance by the intervening portion 12, and the movable element 20 is interposed between the pair of yokes 11. The movable element 20 is movable in a facing direction of both long sides of the yokes 11 (in a direction of an arrow of FIG. 1). That is, the arrow of FIG. 1 indicates a moving direction of the movable element 20.

Each of the yokes 11 has a rectangular flat plate shape and is made, for example, a magnetic material such as iron. The intervening portion 12 is made of a non-magnetic material such as resin or a magnetic material such as iron. For example, the intervening portion 12 is screwed to the yokes 11.

Figure 2:
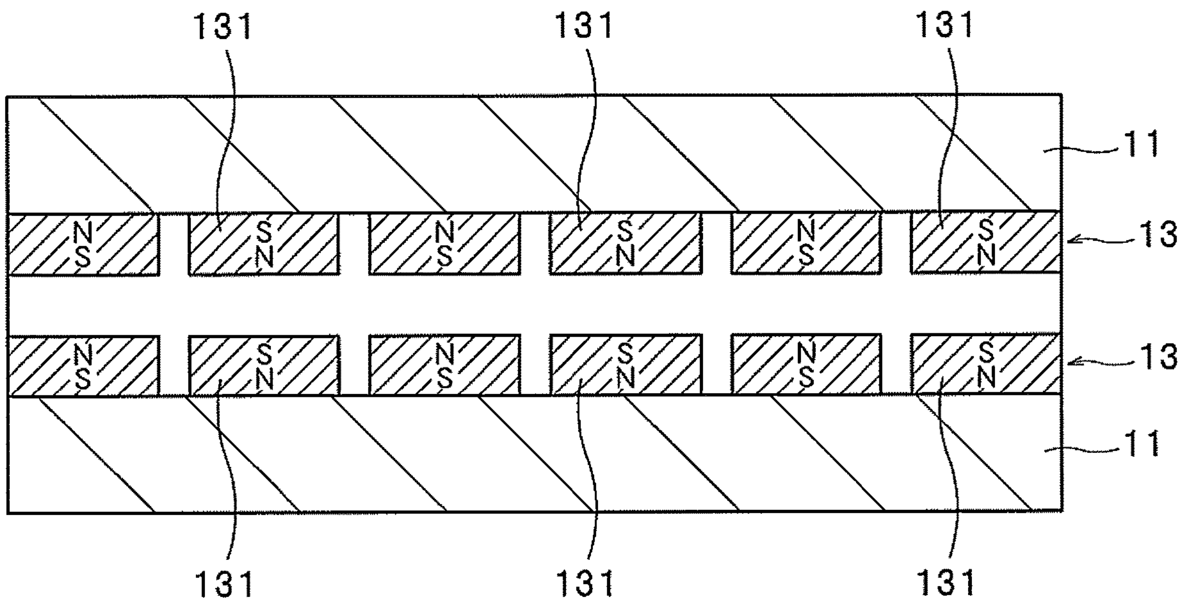
FIG. 2 is a schematic cross-sectional view taken along line II-II of FIG. 1.

FIG. 2 is a schematic cross-sectional view taken along line II-II of FIG. 1. In FIG. 2, for convenience, display of the movable element 20 is omitted.

A magnet unit 13 is attached to an inner surface of each yoke 11. The magnet unit 13 is disposed between the yoke 11 and the movable element 20. In other words, the movable element 20 is interposed between a pair of magnet units 13.

The magnet unit 13 includes a plurality of permanent magnets 131. Each permanent magnet 131 has a square bar shape extending in a length direction of the yoke 11, and the plurality of permanent magnets 131 are arranged in parallel at equal intervals in the moving direction of the movable element 20.

A pair of magnet units 13 forms an alternating magnetic field. Specifically, each permanent magnet 131 has a magnetic pole directed in a facing direction of the pair of magnet units 13, magnetic poles of permanent magnets 131 of the pair of magnet units 13 are reversed in the facing direction, and magnetic poles of permanent magnets 131 adjacent to each other are also reversed.

Figure 3:
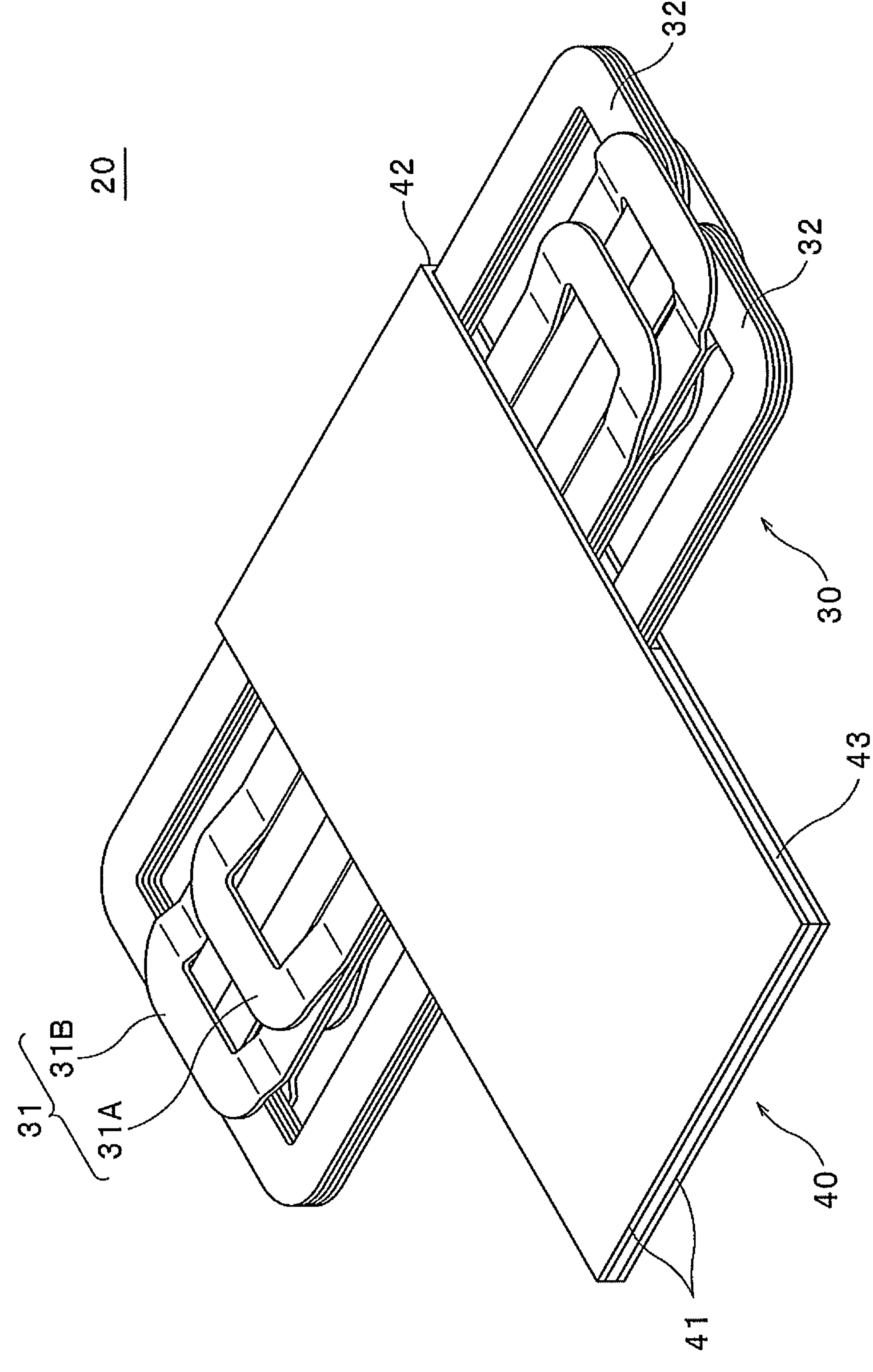
FIG. 3 is a perspective view illustrating a movable element of the linear motor of the present embodiment.

FIG. 3 is a perspective view illustrating the movable element 20 of the linear motor 100 of the present embodiment.

The movable element 20 includes the three-phase coil structure 30 having a plurality of stacked air-core coils, and a clamping member 40 that clamps the three-phase coil structure 30. The clamping member 40 clamps the three-phase coil structure 30 from both sides in an axial direction of the air-core coils of the three-phase coil structure 30.

The clamping member 40 has a rectangular flat plate shape and includes a pair of abutting portions 41 disposed to face to each other and a gusset 42 that connects the pair of abutting portions 41. That is, adjacent short sides of the pair of abutting portions 41 are connected by the gusset 42. The gusset 42 has an elongated rectangular plate shape having approximately the same length as a width dimension of the abutting portions 41. The pair of abutting portions 41 and the gusset 42 are integrally formed and are made of, for example, carbon fiber reinforced plastic (CFRP).

Furthermore, a gap holding portion 43 is provided between the pair of abutting portions 41, extending from approximately the middle in a length direction of the abutting portions 41 to the other short side. The gap holding portion 43 has a rectangular plate shape having approximately the same thickness as a width dimension of the gusset 42, is attached to the abutting portion 41 using screws or adhesive, and maintains a gap between the abutting portions 41. The gap holding portion 43 is made of, for example, glass fiber reinforced plastic (GFRP).

With the above configuration, in the clamping member 40, a gap is formed between the abutting portions 41 and between the gusset 42 and the gap holding portion 43, and the three-phase coil structure 30 is interposed in the gap. The gusset 42 prevents the three-phase coil structure 30 from coming off, and an insulating sheet (not illustrated) made of, for example, GFRP may be interposed between the abutting portion 41 and the three-phase coil structure 30.

Figure 4:
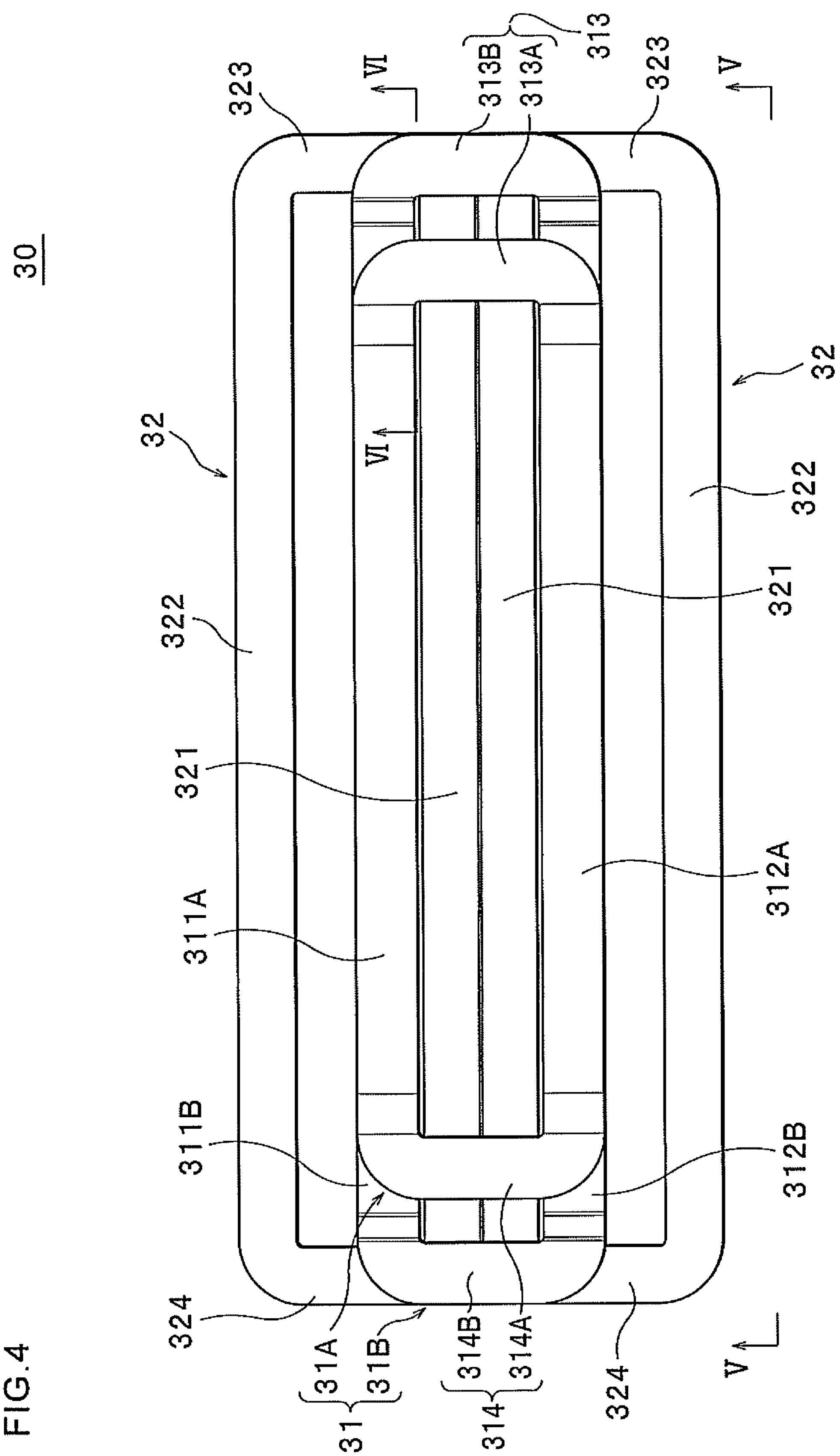
FIG. 4 is a front view illustrating a three-phase coil structure of the linear motor of the present embodiment.
Figure 5:
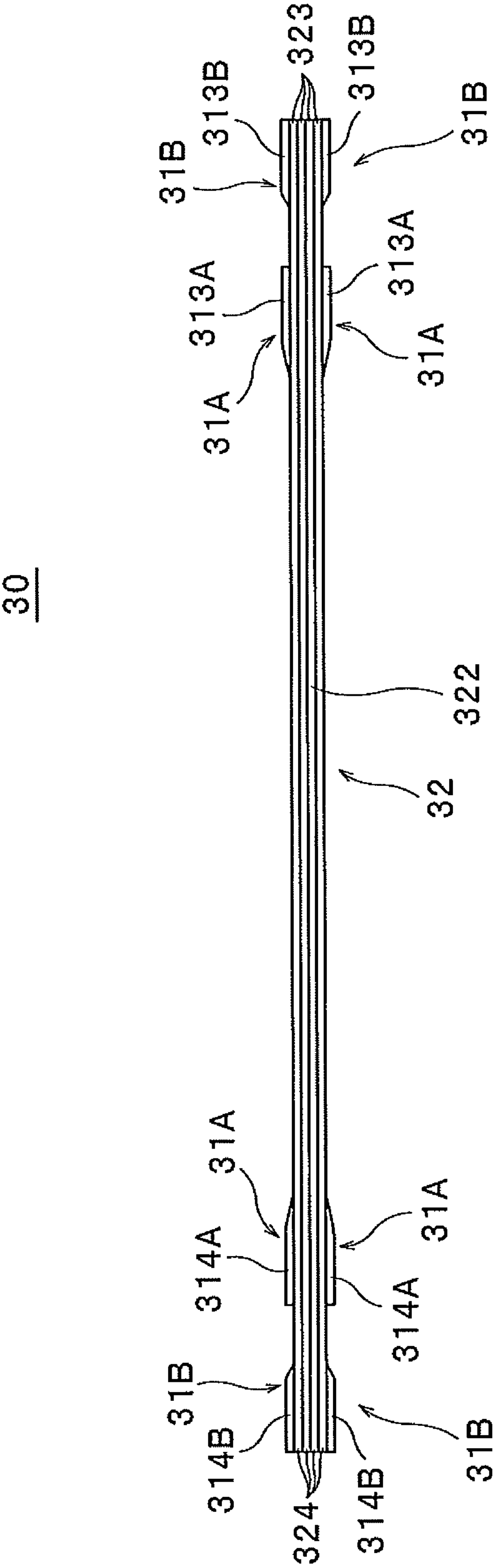
FIG. 5 is an arrow view taken along line V-V of FIG. 4.
Figure 6:
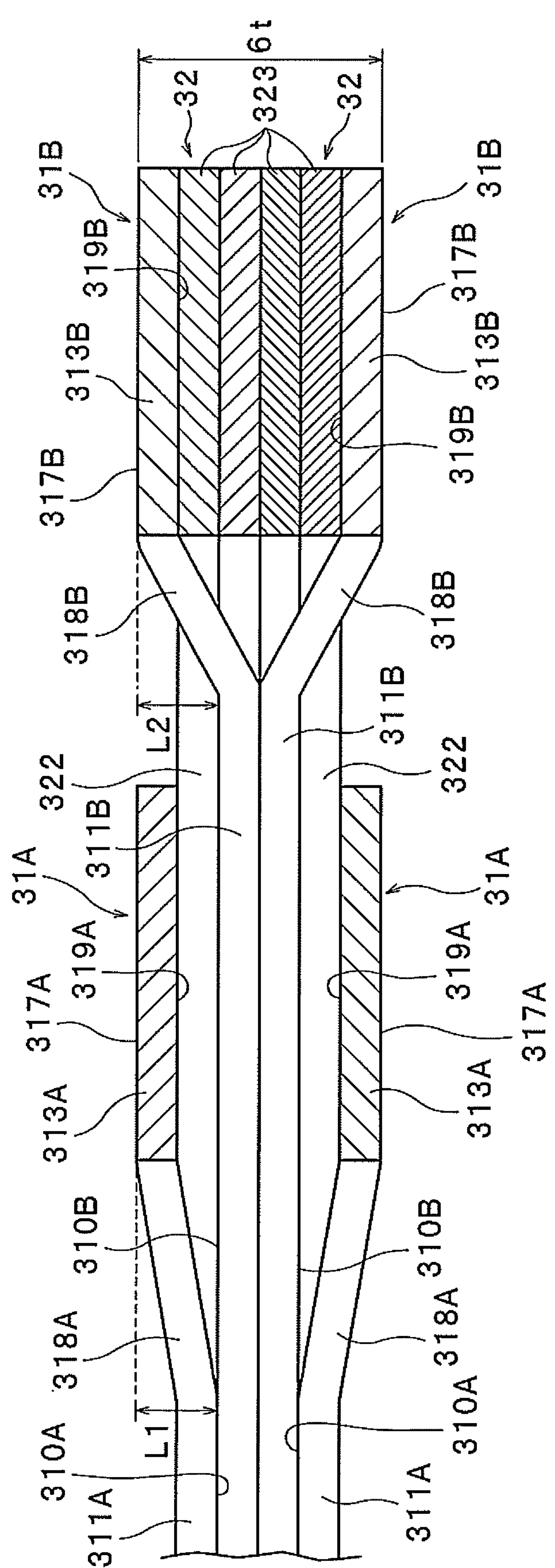
FIG. 6 is a cross-sectional view taken along line VI-VI of FIG. 4.

FIG. 4 is a front view illustrating the three-phase coil structure 30 of the linear motor 100 of the present embodiment, FIG. 5 is an arrow view taken along line V-V of FIG. 4, and FIG. 6 is a cross-sectional view taken along line VI-VI of FIG. 4.

The three-phase coil structure 30 includes a one-phase coil set 31 for a V-phase and a two-phase coil set 32 for a U-phase and a W-phase. That is, the three-phase coil structure 30 has one one-phase coil set 31 and two two-phase coil sets 32. Both the one-phase coil set 31 and the two-phase coil sets 32 include substantially rectangular air-core coils. Note that in FIG. 5, for convenience, lead wires of the one-phase coil set 31 and the two-phase coil sets 32 are not illustrated.

Each of the two-phase coil sets 32 includes two air-core coils disposed on the same axis and having the same length and width dimensions. The two two-phase coil sets 32 are provided so that axial directions thereof are parallel. That is, the two two-phase coil sets 32 are arranged side by side so as to be adjacent to each other in the same plane, and a long side of an air-core coil of one of the two-phase coil sets 32 is in contact with a long side of an air-core coil of the other one of the two two-phase coil sets 32. Further, another two-phase coil set 32 is further stacked on each of the two-phase coil sets 32 in the axial direction (see FIG. 5). The two two-phase coil sets 32 have the same shape, and only one of the two-phase coil sets 32 will be described below.

The one-phase coil set 31 is disposed to straddle long sides of the two two-phase coil sets 32, and includes two air-core coils having different sizes. Hereinafter, the smaller air-core coil will be referred to as a small air-core coil 31A, and the larger air-core coil will be referred to as a large air-core coil 31B. The small air-core coil 31A has a smaller length dimension and the same width dimension when compared to the large air-core coil 31B. The small air-core coil 31A and the large air-core coil 31B are disposed on the same axis. An axial direction of the one-phase coil set 31 is parallel to an axial direction of each of the two-phase coil sets 32, and the one-phase coil set 31 is disposed on each of both sides of the two two-phase coil sets 32 in the axial direction (see FIG. 5).

Each two-phase coil set 32 has a hollow rectangular shape in front view, and includes two long sides 321 and 322 and two short sides 323 and 324. In the two-phase coil set 32, the two long sides 321 and 322 have the same width dimension, and are spaced apart by a distance corresponding to the sum of the width dimensions of the long sides 321 and 322. Further, a long side 321 of one of the two-phase coil sets 32 is adjacent to a long side 321 of the other one of the two-phase coil sets 32.

Similarly to the two-phase coil sets 32, the one-phase coil set 31 has a hollow rectangular shape in front view. The small air-core coil 31A is disposed on one side in the axial direction with respect to the large air-core coil 31B. The small air-core coil 31A includes two long sides 311A and 312A and two short sides 313A and 314A. Moreover, the large air-core coil 31B includes two long sides 311B and 312B and two short sides 313B and 314B (ends).

In the small air-core coil 31A, the two long sides 311A and 312A have the same width dimension, and are spaced apart by a distance corresponding to the sum of the width dimensions of the long sides 311A and 312A. Further, in the large air-core coil 31B, the two long sides 311B and 312B have the same width dimension, and are spaced apart by a distance corresponding to the sum of the width dimensions of the long sides 311B and 312B. That is, in the axial direction, the long sides 311A and 312A of the small air-core coil 31A are in contact with the long sides 311B and 312B of the large air-core coil 31B, respectively (see FIG. 6). Hereinafter, surfaces of the long sides 311A and 312A of the small air-core coil 31A in contact with the long sides 311B and 312B of the large air-core coil 31B are referred to as a contact surface 310A (one surface), and surfaces of the long sides 311B and 312B of the large air-core coil 31B in contact with the long sides 311A and 312A of the small air-core coil 31A are referred to as a contact surface 310B (one surface).

The one-phase coil set 31 and the two two-phase coil sets 32 are disposed so that length directions thereof are parallel to each other, and the one-phase coil set 31 partially overlaps with the two two-phase coil sets 32.

That is, as described above, the one-phase coil set 31 is disposed to straddle the long sides 321 of the two adjacent two-phase coil sets 32. Specifically, the two long sides 321 of the two two-phase coil sets 32 are interposed between the long sides 311A and 312A of the small air-core coil 31A and between the long sides 311B and 312B of the large air-core coil 31B.

In addition, one-side surfaces 319B (opposing surfaces) of the short sides 313B and 314B of the large air-core coil 31B are in contact with the short sides 323 and 324 of the two-phase coil sets 32, and one-side surfaces 319A (opposing surfaces) of the short sides 313A and 314A of the small air-core coil 31A face the long sides 311B and 312B of the large air-core coil 31B and the long sides 321 of the two-phase coil sets 32 (see FIGS. 4 and 6).

Figure 7:
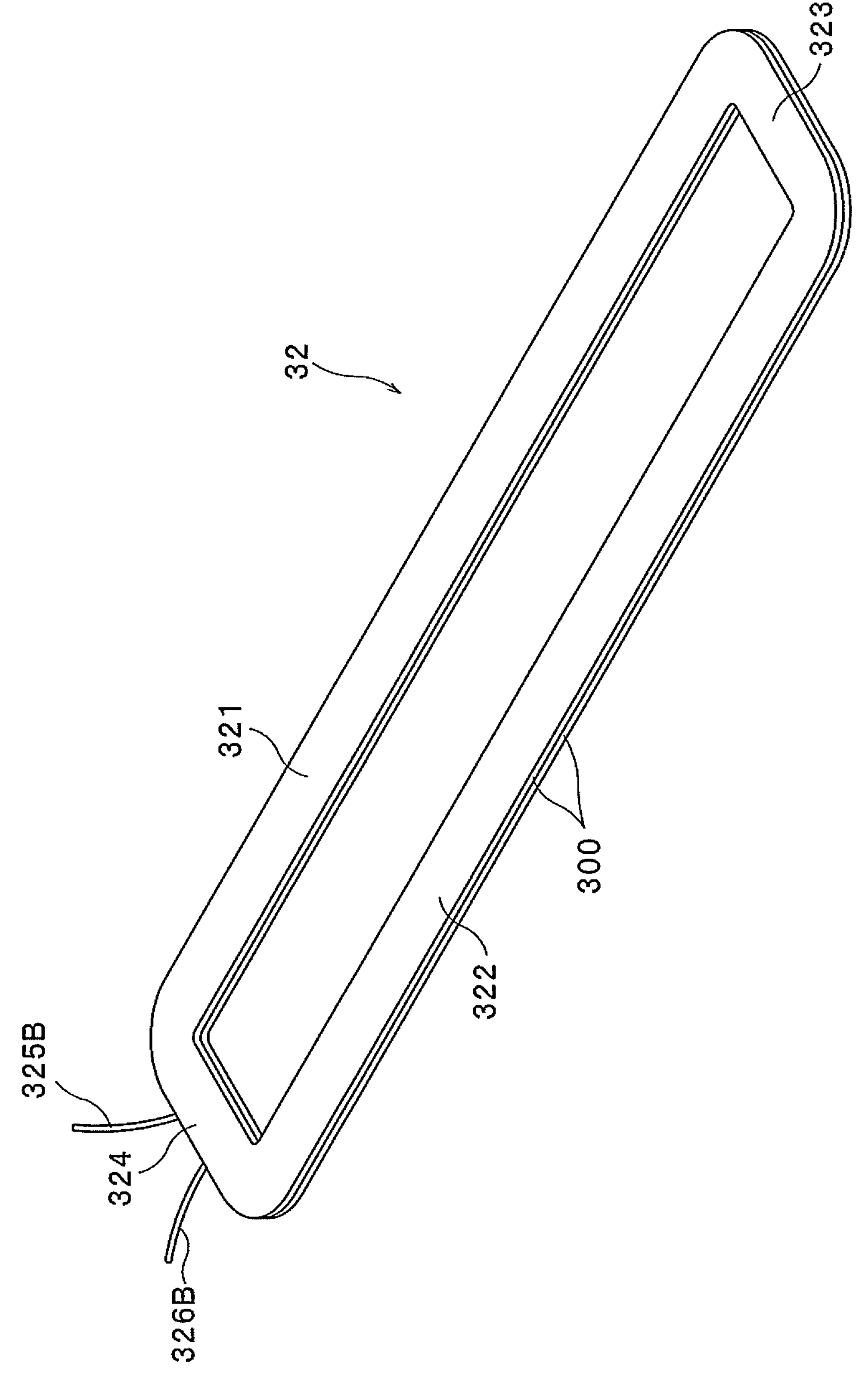
FIG. 7 is a perspective view illustrating a two-phase coil set of the linear motor of the present embodiment.

FIG. 7 is a perspective view illustrating the two-phase coil set 32 of the linear motor 100 of the present embodiment. As described above, the two-phase coil set 32 is flat and includes two rectangular air-core coils 300 disposed on the same axis. That is, in the two-phase coil set 32, the long sides 321 and 322 and the short sides 323 and 324 are provided in the same plane.

Furthermore, the two-phase coil set 32 is formed by stacking the two air-core coils 300 in the axial direction so that winding directions thereof are the same.

For example, each air-core coil 300 is formed by winding a rectangular conductor wire having a strip shape of 1.1×0.54 mm 15 times in a direction perpendicular to the axial direction. The rectangular wires are wound to overlap each other in the thickness direction (of the rectangular wires). That is, the air-core coil 300 has a single layer in the axial direction and has a plurality of layers in a direction orthogonal to the axial direction, and both end surfaces in the axial direction are substantially flat. The rectangular wire is wound with an adhesive made of thermosetting resin such as epoxy resin applied to an outer peripheral surface thereof. The adhesive cures at room temperature or by heating. As a result, the shape of the air-core coil 300 is maintained, and in the two-phase coil set 32, the air-core coils 300 stacked in the axial direction are fixed to each other. In FIGS. 3, 4, and 7, for convenience, the end surfaces (multilayer coil) of the air-core coil 300 in the axial direction are schematically illustrated.

Note that the air-core coil 300 has a lead wire 325B at the beginning of winding and a lead wire 326B at the end of winding. The two-phase coil set 32 is formed by so-called alpha winding.

Figure 8:
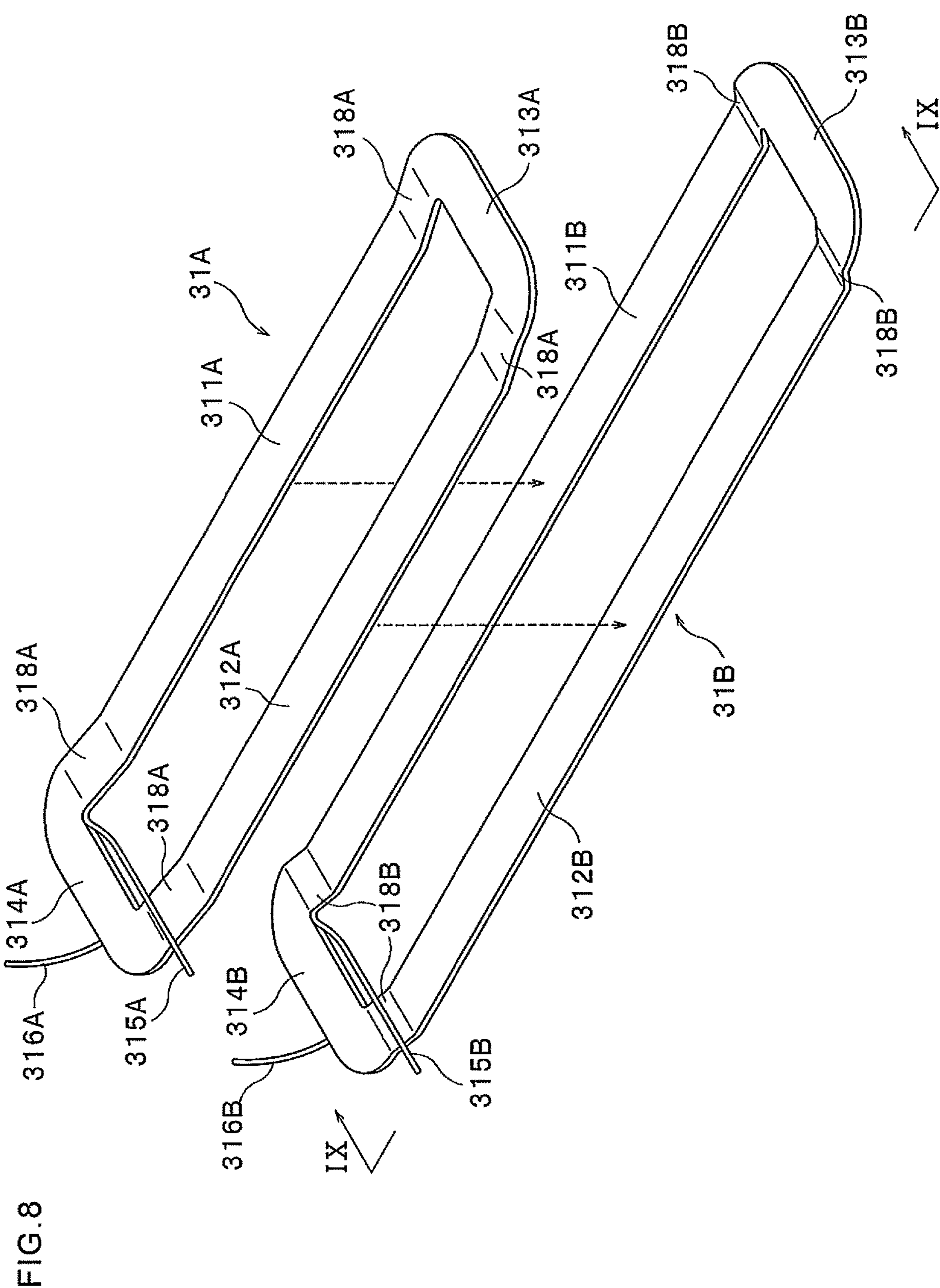
FIG. 8 is a perspective view illustrating a one-phase coil set of the linear motor of the present embodiment.
Figure 9:
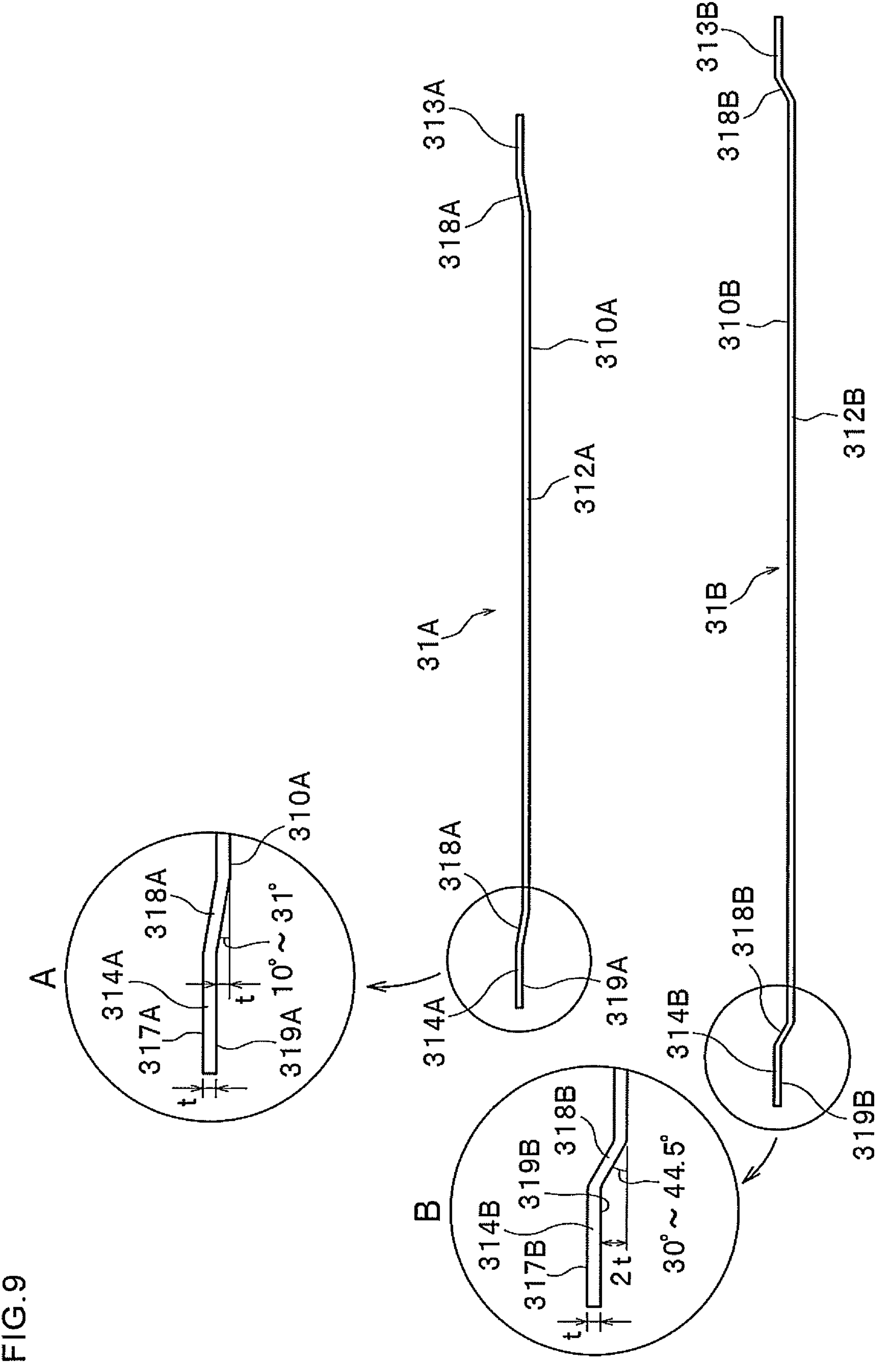
FIG. 9 is an arrow view taken along line IX-IX of FIG. 8.

FIG. 8 is a perspective view illustrating the one-phase coil set 31 of the linear motor 100 of the present embodiment, and FIG. 9 is an arrow view taken along line IX-IX of FIG. 8. FIGS. 9A and 9B are enlarged views enlarging and illustrating circled portions of the small air-core coil 31A and the large air-core coil 31B. For convenience, the small air-core coil 31A and the large air-core coil 31B are separately illustrated in FIG. 8, and illustration of the lead wires is omitted in FIG. 9.

As mentioned above, the one-phase coil set 31 includes the small air-core coil 31A and the large air-core coil 31B disposed on the same axis, and the small air-core coil 31A has a smaller length dimension and the same width dimension when compared to the large air-core coil 31B. Thicknesses of the small air-core coil 31A and the large air-core coil 31B are equal to a thickness of the air-core coil 300 of the two-phase coil set 32.

In addition, the small air-core coil 31A includes two long sides 311A and 312A and two short sides 313A and 314A. Further, the large air-core coil 31B includes two long sides 311B and 312B and two short sides 313B and 314B (ends).

The large air-core coil 31B is bent in a crank shape by performing press processing on both ends of the long sides 311B and 312B. In this way, in the large air-core coil 31B, bent portions 318B are formed at both ends of the two long sides 311B and 312B. After press processing, a length of the large air-core coil 31B in a length direction is the same as that of the air-core coil 300 of the two-phase coil set 32.

Further, in the large air-core coil 31B, an interval between surfaces of the long sides 311B and 312B on the opposite side to the contact surface 310B contacting with the small air-core coil 31A and the one-side surfaces 319B of the short sides 313B and 314B is twice a thickness t of the large air-core coil 31B or the small air-core coil 31A (see FIG. 9B).

Figure 10:
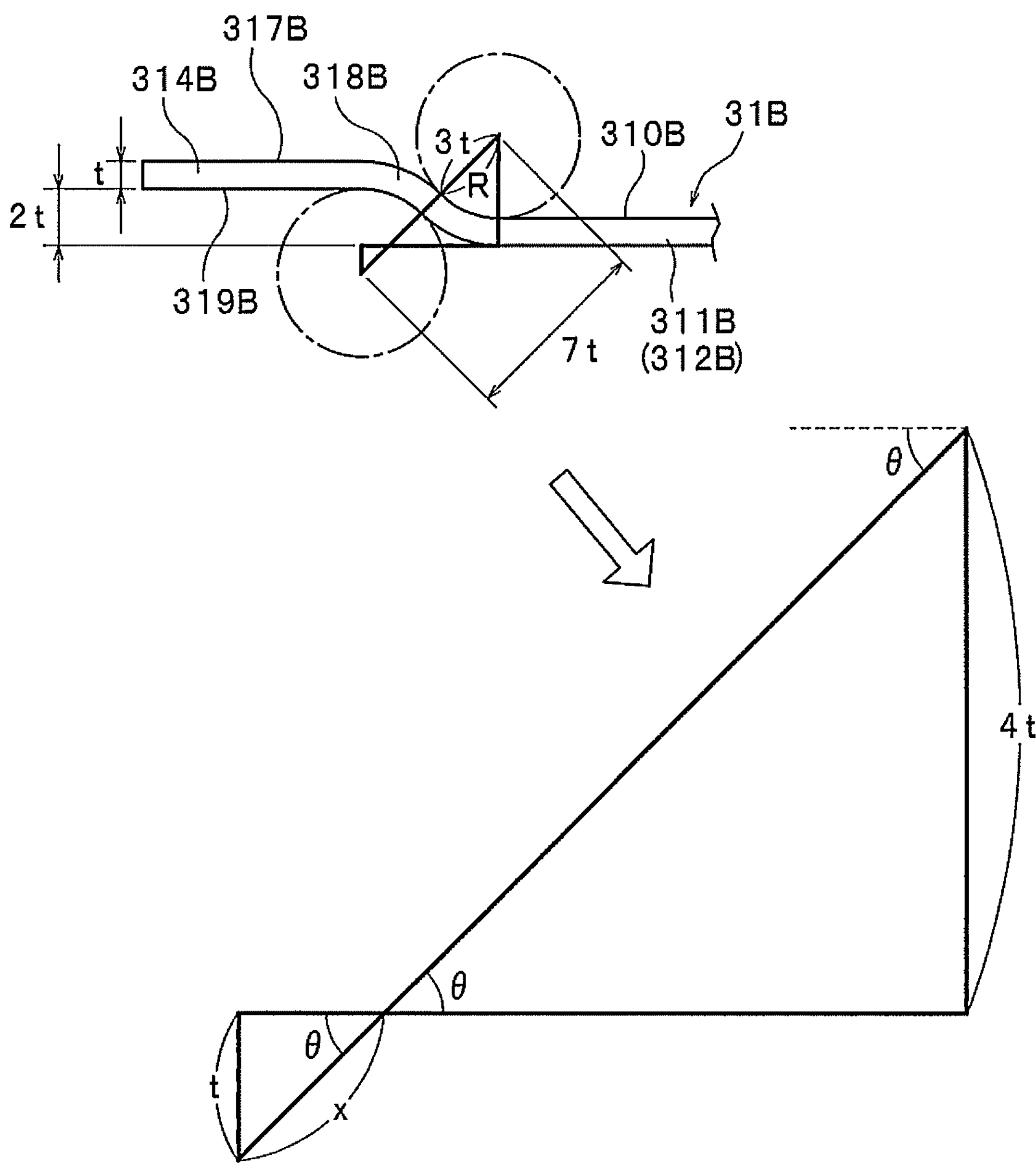
FIG. 10 is an explanatory diagram for describing a bending angle of a large air-core coil.

FIG. 10 is an explanatory diagram for describing a bending angle of the large air-core coil 31B. In FIG. 10, one-point chain lines indicate molding round bars that form the bent portions 318B at both ends of the long sides 311B and 312B of the large air-core coil 31B.

According to the manufacturing record, when a condition of R (a minimum turning radius)>3t is satisfied, cracks are prevented from being generated in the rectangular wire. FIG. 10 illustrates the case of R=3t, and a distance between centers of two molding round bars is 7t. One molding bar is fixed, the other molding bar is rotated by θ around a center of the one molding bar, and the ends of the long sides 311B and 312B of the large air-core coil 31B are bent to obtain a step of 2t.

In FIG. 10, two large and small triangles drawn by solid lines are similar to each other, and a ratio thereof is 1:4. Further, when the distance between the centers of the molding round bars is 7t, the step of the large air-core coil 31B is 2t, and a length of a hypotenuse of a small triangle is x, then the following relationship holds true.

$$\sin\theta = t/x$$

Here, since a similarity ratio of the large and small triangles is 1:4, the distance between the centers (7t) is 5x(x+4x), and x is defined as follows.

$$x = (7/5)t$$

Therefore, sin θ=5/7, and θ is 45.5°. Since a normal line and a tangent line are perpendicular to each other, a bending angle of the bent portion 318B of the large air-core coil 31B is 44.5° (900-45.5°).

In view of the above calculation results, it is sufficient that the bent portion 318B is bent toward the one side in the axial direction at a bending angle of 30° to 44.5° (see FIG. 9). That is, each bent portion 318B is formed obliquely within a range of 30° to 44.5° with respect to a direction perpendicular to the axial direction of the large air-core coil 31B. When the bending angle of the bent portion 318B is less than a lower limit of the range, the thrust is reduced.

When the bending angle of the bent portion 318B exceeds 44.5°, there is concern that a defect such as a crack may occur in the large air-core coil 31B during press processing, and there is concern that an interval between the short sides 313B and 314B of the large air-core coil 31B and the short sides 323 and 324 of the two-phase coil set 32 may increase, so that the thickness of the three-phase coil structure 30 becomes thick. Further, when the bending angle of the bent portion 318B is less than 30°, there is concern that a proportion of the bent portion 318B in each of the long sides 311B and 312B may become large, and a flat portion may become narrow, so that the thrust decreases.

The small air-core coil 31A is bent in a crank shape by performing press processing on both ends of the long sides 311A and 312A. In this way, in the small air-core coil 31A, bent portions 318A are formed on both ends of the two long sides 311A and 312A. In the small air-core coil 31A, an interval from the contact surface 310A of the long sides 311A and 312A to the one-side surfaces 319A of the short sides 313A and 314A is the same as the thickness t of the small air-core coil 31A or the large air-core coil 31B (see FIG. 9A).

Based on the above calculation, the bent portion 318A is preferably bent toward the one side in the axial direction at a bending angle of 10° to 31° (see FIG. 9). That is, each bent portion 318A is formed obliquely within a range of 10° to 31° with respect to a direction perpendicular to the axial direction of the small air-core coil 31A. In other words, the bent portion 318A forms an angle of 10° to 31° with the contact surface 310B of the large air-core coil 31B. When the bending angle of the bent portion 318A is less than a lower limit of the range, the thrust is reduced.

When the bending angle of the bent portion 318A exceeds 31°, a defect such as a crack may occur in the small air-core coil 31A during press processing. Further, when the bending angle of the bent portion 318A is less than 10°, there is concern that a proportion of the bent portion 318A in each of the long sides 311A and 312A may become large, and a flat portion may become narrow, so that the thrust decreases.

Similar to the air-core coil 300 of the two-phase coil set 32, the small air-core coil 31A and the large air-core coil 31B are each formed by winding a rectangular conductor wire a plurality of times in the direction orthogonal to the axial direction. The rectangular wires are wound so as to overlap each other in the thickness direction (of the rectangular wires). That is, each of the small air-core coil 31A and the large air-core coil 31B has a single layer in the axial direction and has a plurality of layers in the direction orthogonal to the axial direction, and both end surfaces in the axial direction are substantially flat. In FIGS. 3 to 8, for convenience, the end surfaces (multilayer coils) of the small air-core coil 31A and the large air-core coil 31B in the axial direction are schematically illustrated.

Moreover, the small air-core coil 31A has a lead wire 315A at the beginning of winding and a lead wire 316A at the end of winding. The large air-core coil 31B has a lead wire 315B at the beginning of winding and a lead wire 316B at the end of winding. Note that the length dimensions of the small air-core coil 31A and the large air-core coil 31B are determined by bending angles of the small air-core coil 31A and the large air-core coil 31B.

As described above, in the large air-core coil 31B, both ends of the long sides 311B and 312B are bent in crank shapes, the short sides 313B and 314B come into contact with the short sides 323 and 324 of the two-phase coil set 32, and the long sides 311B and 312B come into contact with the long sides 311A and 312A of the small air-core coil 31A (see FIG. 6). Moreover, the two-phase coil set 32 includes two air-core coils 300 having a thickness of t, and the short sides 313B and 314B of the large air-core coil 31B have an interval of 2t from a surface on the opposite side to the contact surface 310B of the long sides 311B the 312B (see FIG. 9B), so that the large air-core coil 31B and the two-phase coil set 32 have a thickness of 3t in the axial direction (see FIG. 6).

Furthermore, since the short sides 313B and 314B of the large air-core coil 31B have an interval of 2t from the surface on the opposite side to the contact surface 310B of the long sides 311B the 312B, an interval L2 between other-side surfaces 317B (reverse surfaces) on the opposite side to the one-side surfaces 319B of the short sides 313B and 314B and the contact surface 310B is 2t. In addition, in the small air-core coil 31A, the short sides 313A and 314A have an interval of t from the contact surface 310A of the long sides 311A and 312A as described above, and thus an interval L1 between other-side surfaces 317A (reverse surfaces) on the opposite side to the one-side surfaces 319A of the short sides 313A and 314A and the contact surface 310A is also 2t. Further, the long sides 311A and 312A of the small air-core coil 31A are in contact with the long sides 311B and 312B of the large air-core coil 31B, respectively.

As described above, the interval L1 between the other-side surfaces 317A and the contact surface 310A is equal to the interval L2 between the other-side surfaces 317B and the contact surface 310B, the small air-core coil 31A does not protrude more than the large air-core coil 31B to the one side in the axial direction (see FIG. 6). In this instance, a surface of the small air-core coil 31A on the opposite side to the contact surface 310A of the long sides 311A and 312A is flush with the long side 321 of the two-phase coil set 32. Furthermore, the thickness may be suppressed to 3t despite the fact that the two air-core coils 300 of the two-phase coil set 32 are stacked in the axial direction in addition to the small air-core coil 31A and the large air-core coil 31B (see FIG. 6).

The case where the interval L1 between the other-side surfaces 317A and the contact surface 310A is equal to the interval L2 between the other-side surfaces 317B and the contact surface 310B has been described above as an example. However, the invention is not limited thereto. It is sufficient that the interval L2 is greater than or equal to the interval L1.

As described above, the two two-phase coil sets 32 are stacked in the axial direction, and the one-phase coil set 31 is also provided on the other side of the two-phase coil sets 32 in the axial direction. The one-phase coil set 31 provided on the other side in the axial direction includes the small air-core coil 31A and the large air-core coil 31B, the small air-core coil 31A is disposed on the other side in the axial direction with respect to the large air-core coil 31B, and both ends of the small air-core coil 31A and the large air-core coil 31B are bent in a crank shape to the other side in the axial direction (see FIGS. 5 and 6). Further, the one-phase coil set 31 provided on the other side in the axial direction has the same shape as that of the one-phase coil set 31 described above, and detailed description will be omitted.

That is, in the three-phase coil structure 30 of the present embodiment, a pair of adjacent two-phase coil sets 32 is stacked in the axial direction, the one-phase coil set 31 is provided on each of both sides of the stacked two-phase coil sets 32 in the axial direction, and both ends of one one-phase coil set 31 (the small air-core coil 31A and the large air-core coil 31B) are bent to the opposite side from both ends of the other one-phase coil set 31.

As described above, since one one-phase coil set 31 and a pair of two-phase coil sets 32 have a thickness of 3t in the axial direction, the entire three-phase coil structure 30 in which two one-phase coil sets 31 and a pair of two-phase coil sets 32 are stacked in two layers has a thickness of 6t in the axial direction. Since the one-phase coil set 31 includes the small air-core coil 31A and the large air-core coil 31B, and the two-phase coil sets 32 includes two air-core coils 300, despite the fact that eight air-core coils are stacked, the thickness of the entire three-phase coil structure 30 is suppressed to 6t, and the three-phase coil structure 30 is made compact.

In the linear motor 100 having such a configuration, when the three-phase coil structure 30 is energized, thrust is generated in a direction (hereinafter, moving direction) crossing an alternating magnetic field formed between a pair of magnet units 13 based on the Fleming's left-hand law to push the three-phase coil structure 30 in the moving direction. In this way, the movable element 20 moves (see an arrow of FIG. 1).

Meanwhile, in the three-phase coil structure 30, since the small air-core coil 31A has a smaller length dimension than that of the large air-core coil 31B, a linkage length decreases. There is concern that such reduction in linkage length may cause a decrease in coil impedance and a decrease in thrust.

On the other hand, the linear motor 100 of the present embodiment addresses a problem of a decrease in coil impedance and a decrease in thrust by increasing the number of turns of the one-phase coil set 31. That is, in the linear motor 100 of the present embodiment, the number of turns of the one-phase coil set 31 is larger than that of the two-phase coil set 32.

Specifically, since the one-phase coil set 31 has the small air-core coil 31A and the large air-core coil 31B, the number of turns of the small air-core coil 31A and the number of turns of the large air-core coil 31B may be larger than the number of turns of each air-core coil 300 of the two-phase coil set 32, and both the number of turns of the small air-core coil 31A and the number of turns of the large air-core coil 31B may be larger than the number of turns of the air-core coil 300. In the small air-core coil 31A and the large air-core coil 31B, considering the effect on coil impedance, an inner diameter is made the same as that of the air-core coil 300, so that the number of turns on an outer periphery side far from the axis is increased.

For example, when the number of turns of each air-core coil 300 of the two-phase coil set 32 is 15, the number of turns of the small air-core coil 31A or the large air-core coil 31B is 16 to 17. More specifically, it is desirable that the number of turns of the small air-core coil 31A is 16, and the number of turns of the large air-core coil 31B is 17.

Moreover, the invention is not limited thereto. When considering the change in coil impedance, it is also effective to set the number of turns of each of the small air-core coil 31A and the large air-core coil 31B to 16.

As described above, in the linear motor 100 of the present embodiment, the number of turns of the one-phase coil set 31 is larger than the number of turns of the two-phase coil set 32, and thus it is possible to compensate for the decrease in coil impedance and the decrease in thrust.

Figure 11:
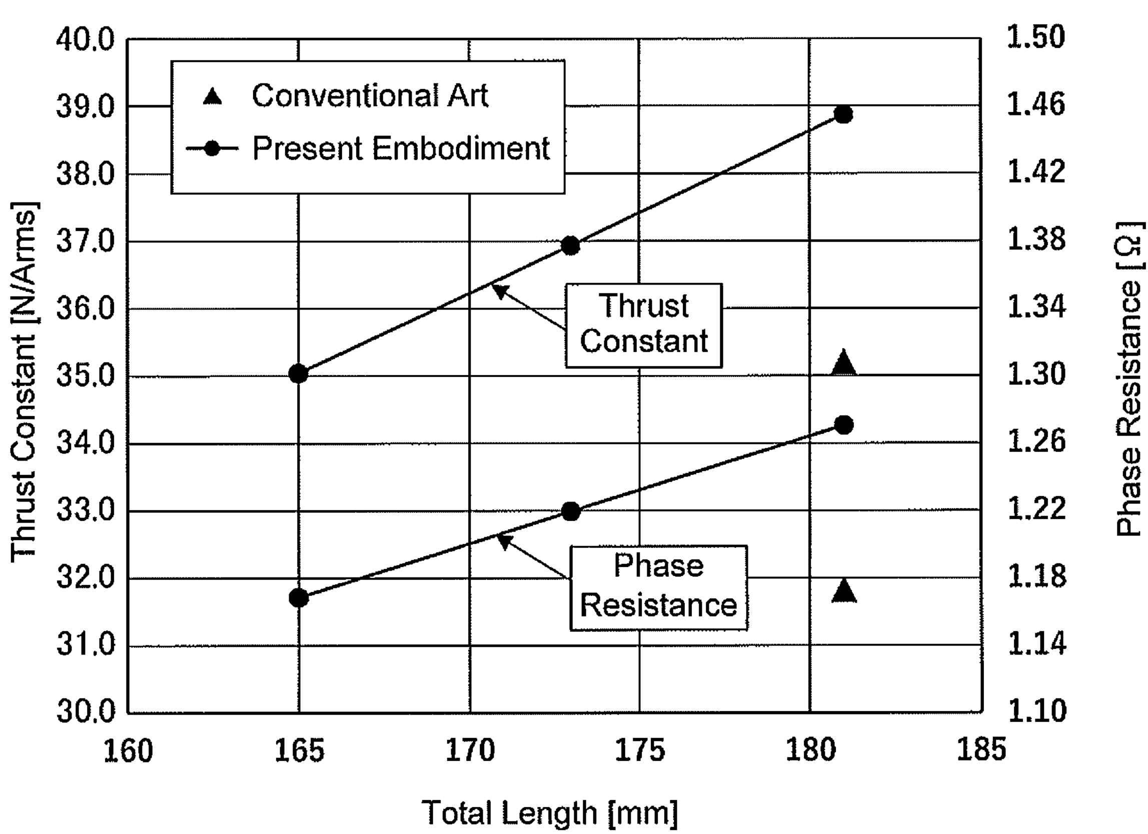
FIG. 11 is a graph comparing thrust and coil impedance of the linear motor of the present embodiment with those of the conventional art.
Figure 12:
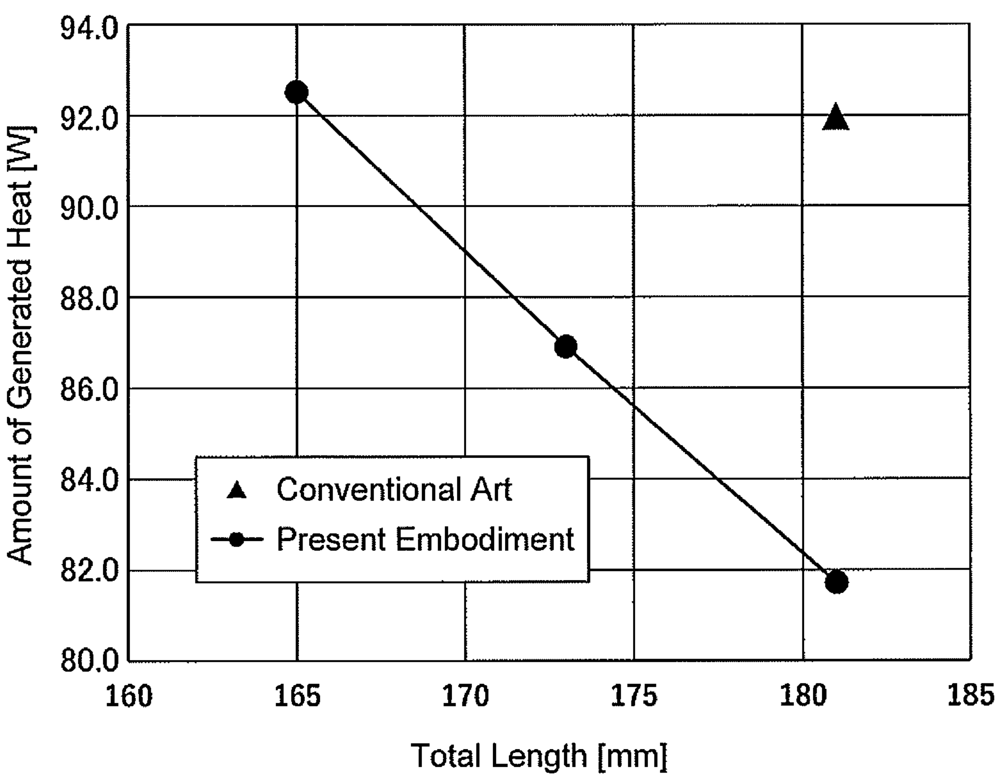
FIG. 12 is a graph comparing the amount of heat generated by the linear motor of the present embodiment with that of the conventional art.

FIG. 11 is a graph comparing thrust and coil impedance of the linear motor 100 of the present embodiment with those of the conventional art, and FIG. 12 is a graph comparing copper loss of the linear motor 100 of the present embodiment with that of the conventional art.

In FIG. 11, a horizontal axis indicates a total length [mm] of the three-phase coil structure 30 (same as a total length of the two-phase coil sets 32 and the large air-core coil 31B, and referred to as a total coil length), a left vertical axis indicates a thrust constant [N/Arms], and a right vertical axis indicates phase resistance (impedance) [Ω].

In addition, in FIG. 11, an upper straight line (circle) indicates the thrust constant of the linear motor 100, and a lower straight line (circle) indicates the phase resistance of the linear motor 100. Furthermore, in FIG. 11, an upper triangle indicates the thrust constant of the conventional art, and a lower triangle indicates the phase resistance of the conventional art.

Further, in FIG. 12, a horizontal axis indicates the total length [mm] of the three-phase coil structure 30 (same as the total length of the two-phase coil sets 32 and the large air-core coil 31B, and referred to as the total coil length), and a vertical axis indicates the amount of generated heat [W]. Note that, in FIGS. 11 and 12, a linear motor according to Patent Literature 1 (Japanese Patent No. 5508362) is given as an example of the conventional art.

As illustrated in FIG. 11, in the linear motor 100 of the present embodiment, an increase in the total coil length is proportional to an increase in the thrust constant and an increase in the phase resistance. A thrust constant value and a phase resistance value achieved when the total coil length was 180 mm in the case of the conventional art were achieved when the total coil length was 165 mm in the case of the linear motor 100 of the present embodiment. Furthermore, in the linear motor 100 of the present embodiment, when the total coil length is 180 mm as in the conventional art, the thrust constant value and the phase resistance value greatly exceed the thrust constant value and the phase resistance value of the conventional art.

Further, in the linear motor 100 of the present embodiment, as the total coil length increases, the amount of heat generated (so-called copper loss) due to the resistance of the conductor (rectangular wire) decreases. The amount of heat generated when the total coil length is 180 mm in the case of the conventional art corresponds to the amount of heat generated when the total coil length is 165 mm in the case of the linear motor 100 of the present embodiment. Furthermore, in the linear motor 100 of the present embodiment, when the total coil length is 180 mm as in the conventional art, the amount of heat generated is much lower than that of the conventional art.

As can be seen from FIGS. 11 and 12, in the linear motor 100 of the present embodiment, while the three-phase coil structure 30 is made more compact with the above-described configuration, reduction in coil impedance and reduction in thrust associated therewith are compensated, and performance is further improved.

Furthermore, in the linear motor 100 of the present embodiment, heat dissipation can be improved by the above-described configuration. For example, when heat dissipation is defined as the amount of heat generated per unit area [W/S], it can be considered that the smaller the amount of heat generated, the smaller the temperature rise of the coil, and therefore the better the heat dissipation.

Figure 13:
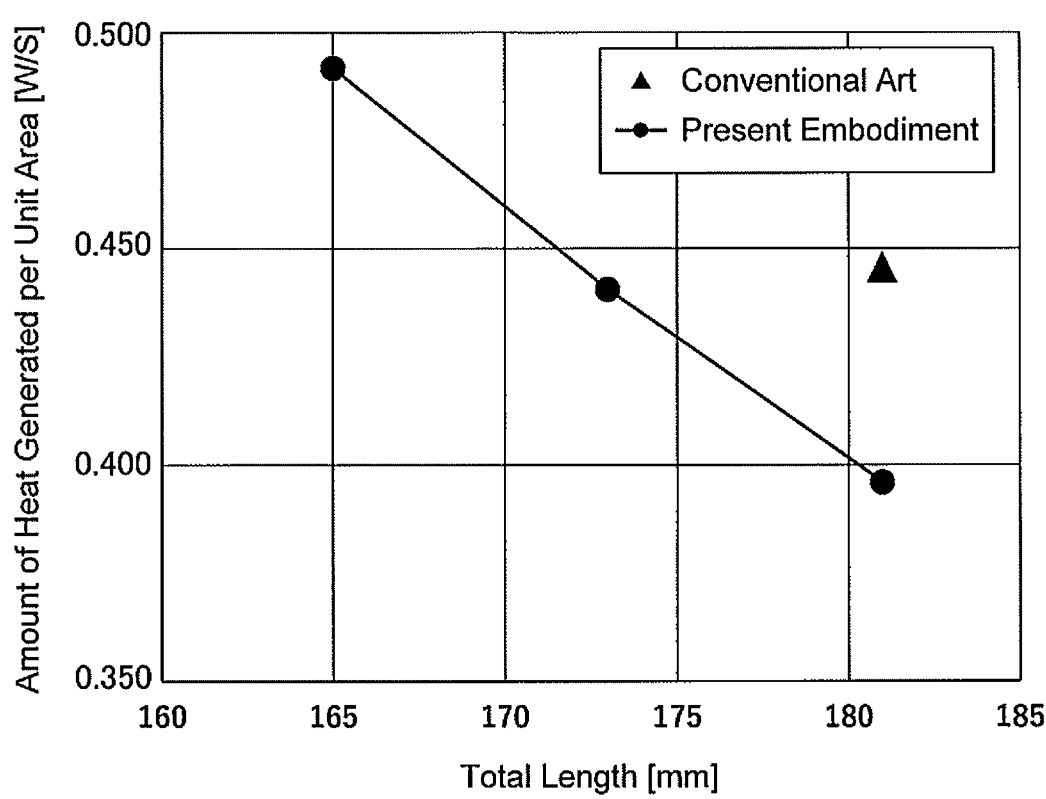
FIG. 13 is a graph comparing the amount of heat per unit area generated by the linear motor of the present embodiment with that of the conventional art.

FIG. 13 is a graph comparing the amount of heat per unit area generated by the linear motor 100 of the present embodiment with that of the conventional art. In FIG. 13, a horizontal axis indicates the total length [mm] of the three-phase coil structure 30 (same as the total length of the two-phase coil sets 32 and the large air-core coil 31B, and referred to as the total coil length), and a vertical axis indicates the amount of heat generated per unit area [W/S]. Note that, in FIG. 13, the linear motor according to Patent Literature 1 (Japanese Patent No. 5508362) is given as an example of the conventional art.

In the linear motor 100 of the present embodiment, as the total coil length increases, the amount of heat generated per unit area decreases. The amount of heat generated per unit area when the total coil length is 180 mm in the case of the conventional art is equivalent to the amount of heat generated per unit area when the total coil length is 173 mm in the case of the linear motor 100 of the present embodiment. Furthermore, in the linear motor 100 of the present embodiment, when the total coil length is 180 mm as in the conventional art, the amount of heat generated per unit area is much lower than the amount of heat generated per unit area of the conventional art. In the linear motor 100 of the present embodiment, while the three-phase coil structure 30 is made more compact, heat dissipation is improved.

The disclosed embodiments should be considered to be illustrative and not restrictive in all respects. The scope of the invention is indicated by the claims rather than the above description, and it is intended that all changes within the meaning and scope equivalent to the claims are included.

It is to be noted that, unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The invention claimed is:

1. A three-phase coil structure having a two-phase coil set including a plurality of rectangular air-core coils arranged side by side in the same plane so as to be adjacent to each other, the three-phase coil structure comprising:

a one-phase coil set including two air-core coils having different sizes and bending angles bent at both ends and disposed to straddle adjacent long sides of the two-phase coil set, wherein a number of turns of the air-core coils of the one-phase coil set is larger than a number of turns of the air-core coils of the two-phase coil set.

2. The three-phase coil structure according to claim 1, wherein:

the one-phase coil set includes a large air-core coil having a length dimension equivalent to a length dimension of the air-core coils of the two-phase coil set, and a small air-core coil having a length dimension smaller than a length dimension of the large air-core coil, and the number of turns of at least one of the large air-core coil and the small air-core coil is larger than the number of turns of each of the air-core coils of the two-phase coil set.

3. The three-phase coil structure according to claim 2, wherein:

the large air-core coil and the small air-core coil are disposed on the same axis, and both ends of each of the large air-core coil and the small air-core coil are bent in a crank shape to one side in an axial direction, and both ends of the large air-core coil overlap with ends of the air-core coil of the two-phase coil set, respectively.

4. The three-phase coil structure according to claim 3, wherein:

the both ends of the large air-core coil are bent at 30° to 44.5°, and the both ends of the small air-core coil are bent at 10° to 31°.

5. The three-phase coil structure according to claim 4, wherein:

the small air-core coil is disposed on the one side in the axial direction with respect to the large air-core coil, and one surface of the small air-core coil is in contact with one surface of the large air-core coil, and an interval between the one surface of the large air-core coil and a reverse surface of an opposing-surface facing the two-phase coil set of the ends of the large air-core coil is greater than or equal to an interval between the one surface of the small air-core coil and a reverse surface of an opposing-surface facing the large air-core coil of the ends of the small air-core coil.

6. The three-phase coil structure according to claim 3, wherein:

two two-phase coil sets are stacked in one direction, the one-phase coil set is provided on each of both sides of the two stacked two-phase coil sets in the one direction, and the two one-phase coil sets are disposed on the same axis and both ends of each of the two one-phase coil sets are bent in mutually opposite directions.

7. A linear motor comprising:

the three-phase coil structure according to claim 1; and magnets disposed on both sides of the three-phase coil structure so as to face each other in the axial direction of the one-phase coil set.

* * * * *